United States Patent [19]
Sakaibara et al.

[11] Patent Number: 5,673,374
[45] Date of Patent: Sep. 30, 1997

[54] METHOD AND APPARATUS FOR NON-DISTURBED SPECULAR REFLECTIONS ON TEXTURED SURFACES

[75] Inventors: Toru Sakaibara, Kawasaki; Toshiyuki Kuwana; Ryo Fujita, both of Hitachi, all of Japan

[73] Assignee: Hitachi, Ltd., Tokyo, Japan

[21] Appl. No.: 53,371

[22] Filed: Apr. 28, 1993

[30] Foreign Application Priority Data

Apr. 28, 1992 [JP] Japan ................................ 4-110379

[51] Int. Cl.$^6$ ................................................ G06T 15/50
[52] U.S. Cl. ............................................................ 395/126
[58] Field of Search .................................. 395/125, 126, 395/130

[56] References Cited

U.S. PATENT DOCUMENTS

| | | | |
|---|---|---|---|
| 4,817,005 | 3/1989 | Kubota et al. | 395/125 X |
| 4,899,295 | 2/1990 | Nonweiler | 395/125 |
| 5,185,856 | 2/1993 | Allom et al. | 395/130 |
| 5,222,205 | 6/1993 | Larson et al. | 395/130 |
| 5,224,208 | 6/1993 | Miller, Jr. et al. | 395/125 |

*Primary Examiner*—Mark K. Zimmerman
*Attorney, Agent, or Firm*—Antonelli, Terry, Stout & Kraus, LLP.

[57] ABSTRACT

Intensities of light reflected from a surface of an object to be displayed are calculated as to values of an ambient light reflection component, a diffuse light reflection component, and a specular reflection component. Judgement is made as whether the calculated value of the specular reflection component exceed a predetermined value. Texture data are blended with a sum of the calculated ambient light reflection component value and the calculated diffuse light reflection component value. If it is judged that the calculated specular reflection component value exceeds the predetermined value, the specular reflection component value is added to the blended value of the texture data with the sum of the calculated ambient light reflection component value and the calculated diffuse light reflection component value.

5 Claims, 9 Drawing Sheets

| BLENDING METHOD | TEXTURE DATA | OUTPUT R INTENSITY | OUTPUT G INTENSITY | OUTPUT B INTENSITY | OUTPUT α VALUE |
|---|---|---|---|---|---|
| MULTIPLI- CATION | It | Ri * It | Gi * It | Bi * It | αi |
|  | It, αt | Ri * It | Gi * It | Bi * It | αi * αt |
|  | Rt, Gt, Bt | Ri * Rt | Gi * Gt | Bi * Bt | αi |
|  | Rt, Gt, Bt, αt | Ri * Rt | Gi * Gt | Bi * Bt | αi * αt |
| ADDITION | It | - | - | - | - |
|  | It, αt | - | - | - | - |
|  | Rt, Gt, Bt | Ri + Rt | Gi + Gt | Bi + Bt | αi |
|  | Rt, Gt, Bt, αt | (1-αt) * Ri + αt * Rt | (1-αt) * Gi + αt * Gt | (1-αt) * Bi + αt * Bt | αi |

SYMBOL * DENOTES MULTIPLICATION

FIG. 11 PRIOR ART

METHOD AND APPARATUS FOR NON-DISTURBED SPECULAR REFLECTIONS ON TEXTURED SURFACES

BACKGROUND OF THE INVENTION

The present invention relates to a method for displaying a realistic image of an object to be displayed with the appearance of textured material in a high-speed process with use of a small-scale hardware, or to a texture mapping method, and an apparatus for execution of the method.

First of all, the following describes a conventional process of displaying a three-dimensional object which is executed by a hardware containing a computer.

With the conventional process of displaying the three-dimensional object, the three-dimensional object to be displayed is ordinarily approximated to a polyhedron. Polygons forming the polyhedron are sequentially displayed until finally a destination three-dimensional object is displayed.

This means that the process of displaying the three-dimensional object can be made by contemplating display of the polygons forming the three-dimensional object.

Figure 9:
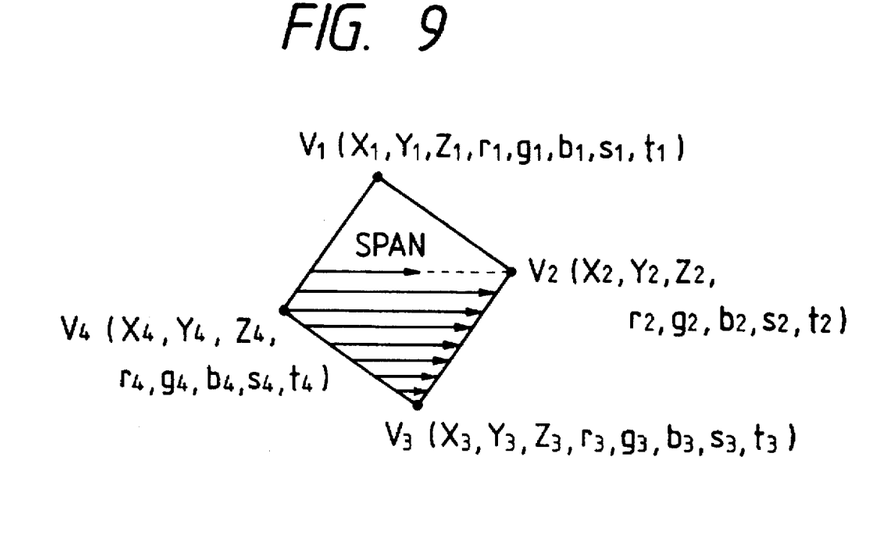
FIG. 9 illustrates an example of a filling process for a polygon.

FIG. 9 is an example of a filling process which is a main practice in the display process of any of the polygons.

First, the polygons should be divided into horizontal line segments (hereinafter referred to as the spans) on the basis of data as to vertices V1, V2, V3, and V4 thereof, for example, coordinates Xi, Yi, and Zi, RGB intensities ri, gi, and bi, and if texture mapping is made, texture coordinates si and ti of the vertices, where i is 1 to 4. Data of pixels forming an image are sequentially written into a frame buffer for storing the data of the image to be displayed from a bottom of the polygon.

This process is accomplished in a manner that linear interpolation, such as color interpolation, is made for each of the pixels on each of the spans to obtain the RGB intensities which are data as to the color. The RGB intensities then are sequentially written at predetermined addresses in the frame buffer.

Figure 10:
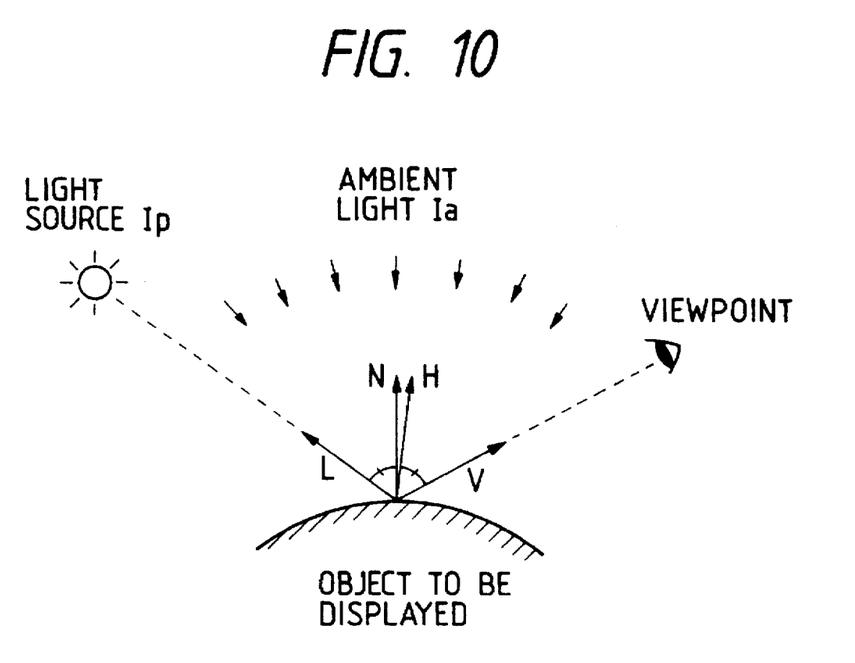
FIG. 10 shows a model illustrating light reflected from an object.

The RGB intensities at any of the vertices can be calculated in terms of a light source direction and a reflection coefficient of a light reflecting surface using a light reflection model shown in FIG. 10.

I denotes a light intensity. The light intensity I can be given as $$I = K_a \times I_a + \{K_d \times (N \cdot L) + K_s \times (N \cdot H)^{\wedge} n\} \times I_p \qquad (1)$$

where Ip is a light intensity from a light source, Ia is an ambient light intensity which is a light incident from in many directions from a circumference of the object, N is a normal vector, L is a vector toward the light source, V is a vector toward a viewpoint, H is a vector which is normalized halfway between the vector L and the vector V, Ka is an ambient reflection coefficient of the displayed object, Kd is a diffuse reflection coefficient of the displayed object, Ks is a specular reflection coefficient, n is a specular-reflection exponent, · is a scalar vector product, and ^ is an exponentiation. The vector H is given as H=(L+L)/|L+V|.

In fact, necessary color data are calculated for each of the colors R, G, and B using Eq. 1.

The first term Ka×Ia in Eq. 1 represents the ambient light reflection component, the second term Kd×(N·L)×Ip is the diffuse light reflection component, and the third term {Ks× (N·H) ^n}×Ip is the specular reflection component.

The ambient and diffuse light reflection components are reflection components which are affected by the color of the object. The specular reflection component, on the other hand, represents shining of the object, or a highlight of the object, so that it is not affected by the color of the object, or not affected by the texture. The specular reflection component therefore is a direct output of the color of the object.

In other words, the specular reflection component does not virtually change its value depending on the color of the surface of the displayed object, while the ambient and diffuse light reflection components change their values depending on the color, or among the colors R, G, and B.

To display the realistic image of the object, Eq. 1 must be used to calculate the RGB intensities for every pixel. However, there is the problem that the calculation can take too much time.

To shorten the calculation time, calculation is usually made of the RGB intensities only at the vertices of the polygon, and those of the pixels are obtained by the linear interpolation.

That is, the RGB intensities at both ends of each span should be obtained by, for example, linear interpolation. Those of any of the pixels on the span should be obtained in terms of the values at the both ends of the span by, for example, the linear interpolation. This method has been known.

The following describes the conventional texture mapping apparatus on the basis of the general description of the process of displaying the three-dimensional object with the Japanese Patent Application Laid-Open 3-138779 taken as an example.

Figure 11:
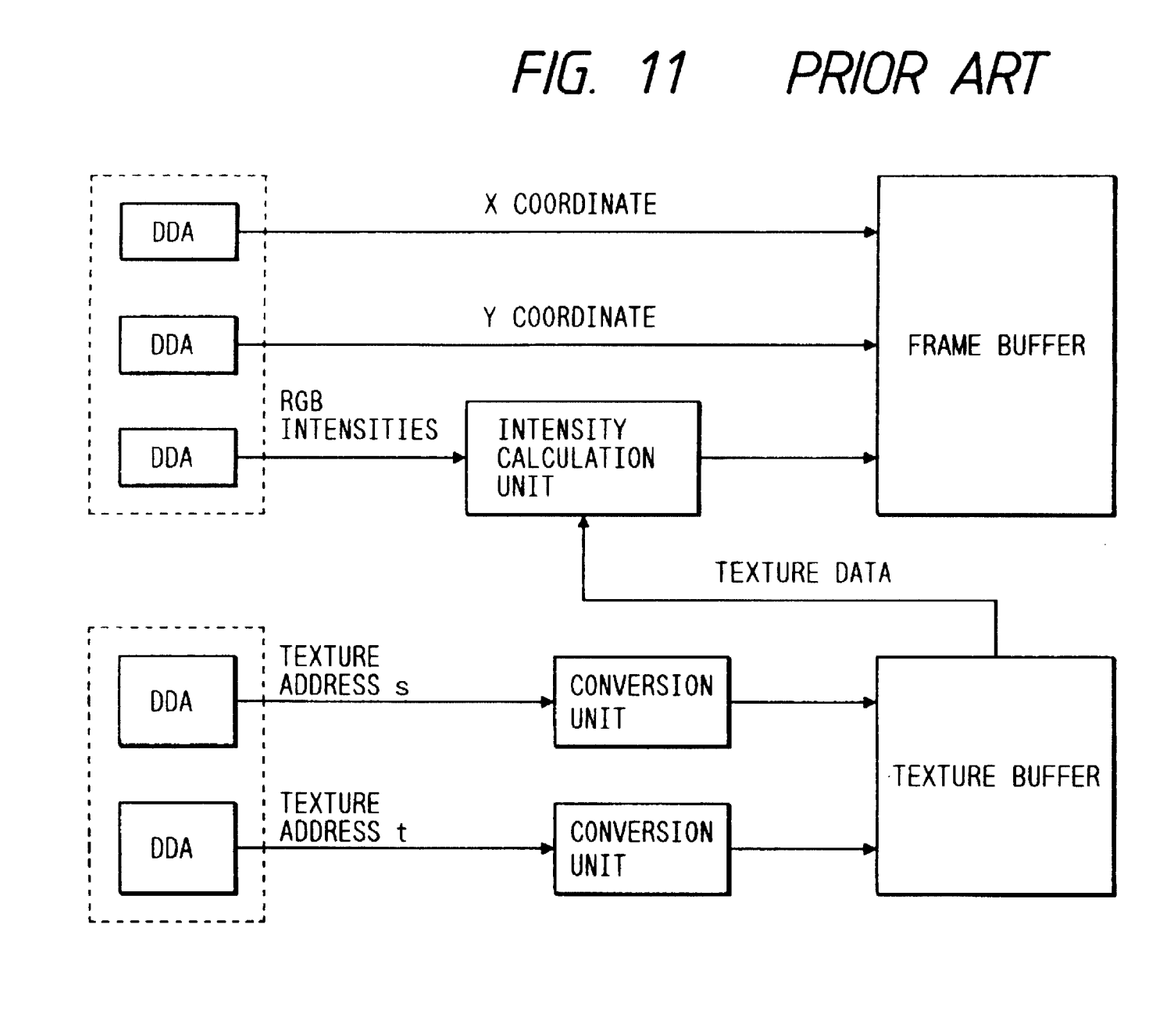
FIG. 11 is a block diagram illustrating an example of conventional texture mapping apparatuses.

The conventional apparatus described in the application adds to or multiplies by texture data RGB intensities obtained in the lighting calculation using Eq. 1 mentioned above to blend them. The blended results are displayed. FIG. 11 shows an embodiment given in the application.

As shown in FIG. 11, a group of DDAs (abbreviated for digital differential analyzers which are a kind of primitive pixel value generator) obtains X and Y coordinates, the RGB intensities, and texture addresses s and t of a pixel to be written into a frame buffer.

The texture addresses s and t are limited within an effective value range as to their specified address range by their respective conversion units before being sent to a texture buffer.

In turn, texture data are read out of the texture buffer before being blended with the RGB intensities in an intensity calculation unit. The blended data are written into the frame buffer. The data in the frame buffer are read out before being displayed as an image, thus realizing the texture mapping.

As described above, the conventional texture mapping apparatus blends with the texture data the total RGB intensities obtained with the lighting calculation using Eq. 1 without taking the three kinds of reflection components into account. That is, the conventional apparatus gives no consideration to blending the texture data with the light reflection components of different properties obtained in the course of the lighting calculation, or with each of the ambient light reflection components, the diffuse light reflection component, and the specular reflection component, depending on their respective properties.

In other words, the conventional apparatus does not give any consideration to the fact that the specular reflection component is highly affected only by the color of the light source without virtual effect by the texture, while the ambient and diffuse light reflection components are greatly affected by the texture.

As described above, the conventional method is not capable of displaying a realistic image since the texture is added to the highlight which glows in a color of the light source itself irrespective of the color of the object. This is due to the fact that the texture affects even the specular reflection component.

In the conventional texture mapping art described above, it is difficult to display the realistic image since it has no properties of the light reflection components taken into account in the lighting calculation.

That is, the previous texture mapping art is disadvantageous in that it even applies the texture to the specular reflection component which is not affected thereby, and thus is unable to shorten the calculation time.

SUMMARY OF THE INVENTION

In view of the foregoing, it is an object of the present invention to provide a method for achieving a more realistic texture mapping in a way that texture data are blended with light reflection components in lighting calculation as needed, with properties of the light reflection components being taken into account.

Another object of the present invention is to provide an apparatus for executing the method while keeping its hardware from increasing.

Briefly, the foregoing object is accomplished in accordance with aspects of the present invention by the texture mapping method. The method comprises the following steps.

First, RGB intensities at each of the vertices of a polygon are calculated for each of an ambient and diffuse light reflection components and a specular reflection component.

In turn, judgement is made as to whether or not the specular reflection should be taken into account depending on an intensity of the specular reflection component.

In other words, the specular reflection component should be taken into account in writing pixels on a span only if the intensity of the specular reflection component is higher than a predetermined level. (No texture data are blended with the specular reflection component.)

In turn, a color interpolation art is used to obtain RGB intensities at both span edges in terms of RGB intensities of the ambient and diffuse light reflection components at the vertices.

Also, color interpolation is used to obtain RGB intensities at each of the pixels on the span, and the corresponding texture data are blended with the obtained RGB intensities of the pixels.

If the specular reflection component must be taken into account, values of RGB intensities at both span edges are obtained in terms of RGB intensities of the specular reflection components at the vertices. Also, values of RGB intensities of the specular reflection component at each of the pixels on the span are obtained by the color interpolation. The obtained RGB intensities are added to the values of the RGB intensities of the ambient and diffuse light reflection components blended with the texture data. Results of the addition are written into a frame buffer. This accomplishes the realistic display of an image since the values of the ambient and diffuse reflection components having the texture data blended therewith have the values of the RGB intensities of the specular reflection component being free of the texture added thereto.

The above-described process of the present invention is accomplished in a way that individual sets of DDAs are used differently for the RGB intensities of the ambient and diffuse light reflection components and for the RGB intensities of the specular reflection component, respectively. Alternatively, the process can be made by only a single set of DDAs in a way that the one and same set of DDAs can be operated twice on each span.

First, the set of DDAs should blend the RGB intensities of the ambient and diffuse light reflection components with the texture data before writing results of the blending into the frame buffer. Second, the set of DDAs should calculate and add the RGB intensities of the specular reflection component to the blended values of the RGB intensities of the ambient and diffuse light reflection components with the texture data stored in the frame buffer before writing results of the addition into the frame buffer again.

Thus, only the single set of DDAs can perform blending with the texture data with the light reflection components taken into account.

DETAILED DESCRIPTION OF THE PREFERRED EMBODIMENT

The following describes in detail embodiments according to the present invention by reference to the accompanying drawings.

Figure 2:
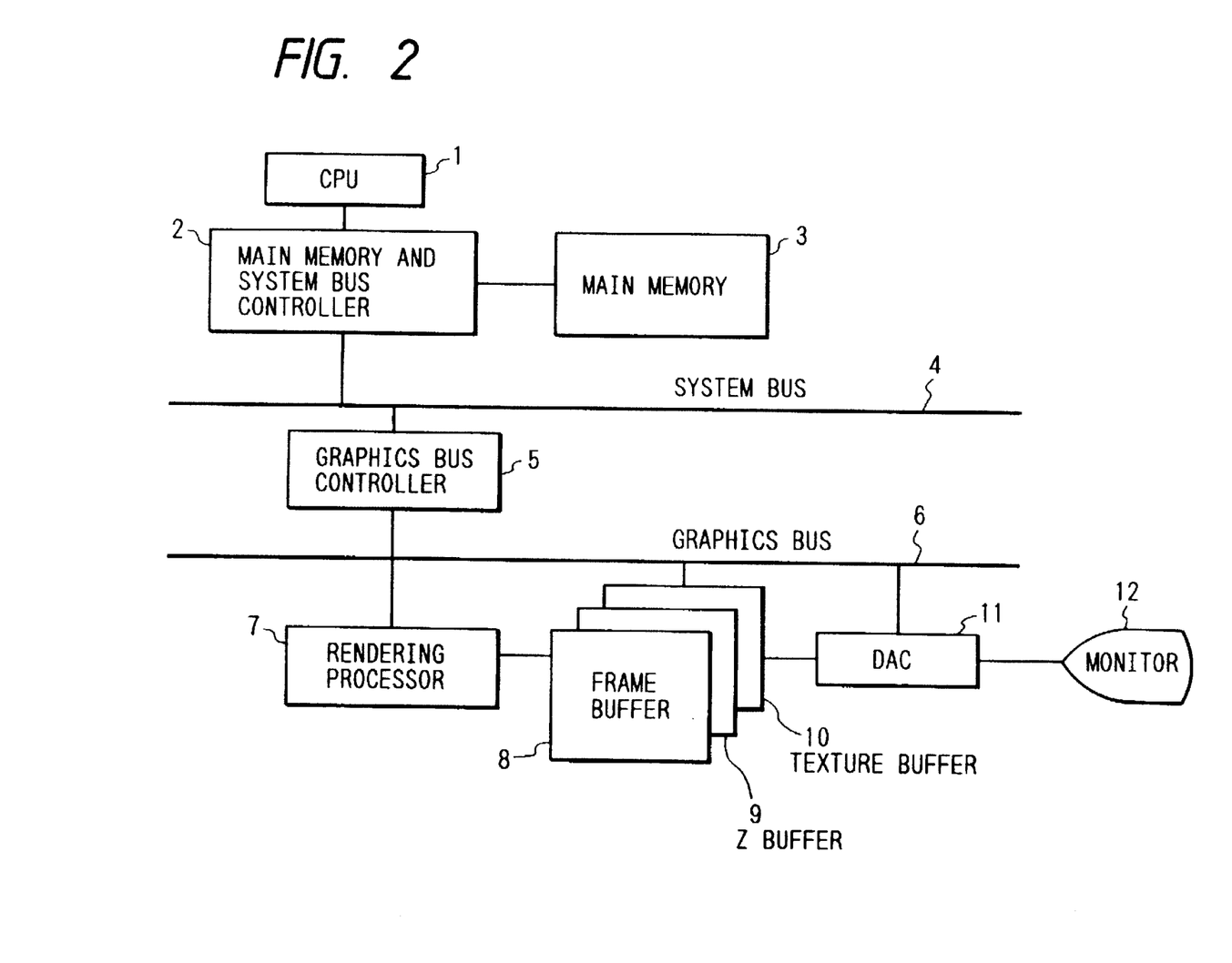
FIG. 2 is a block diagram illustrating an example of systems for executing the texture mapping method according to the present invention.

FIG. 2 is a block diagram illustrating an embodiment of a texture mapping apparatus for accomplishing a method of the present invention.

The embodiment mentioned above comprises a CPU 1, a main memory and system bus controller 2, a main memory 3, a system bus 4, a graphics bus controller 5, a graphics bus 6, a rendering processor 7, a frame buffer 8, a Z buffer, a texture buffer 10, a DAC (digital-analog converter) 11, and a monitor 12.

The CPU 1 is a means for display processes, such as geometric transformation and lighting calculations, for displaying a texture-mapped three-dimensional object. The CPU 1 also serves the entire system to control the rendering processor 7, the frame buffer 8, the Z buffer, the texture buffer 10, the DAC 11, and the other means. The CPU 1 can be made up of, for example, a semiconductor microprocessor.

The main memory and system bus controller 2 is a means for controlling access of the CPU 1 to the main memory 3 and for controlling the system bus 4. The main memory and system bus controller 2 can be made up of, for example, adequate electronic devices, such as TTLs and transistors.

The main memory 3 is a means for storing data needed for specific processes. The main memory 3 can be made up of, for example, adequate electronic devices, such as a RAM which is a semiconductor device.

The system bus 4 is a means for transferring data or control signals between the CPU 1 and the main memory 3 and the graphics bus controller 5. The system bus 4 can be made up of, for example, adequate electrical harnesses and adequate connectors.

The system bus 4 also is a means for connecting external input/output units (not shown) to the CPU 1 and the main memory 3.

The graphics bus controller 5 is a means for sending or receiving data or control signals between the CPU 1 and the main memory 3. The graphics bus controller 5 also controls the graphics bus 6. The graphics bus controller 5 can be made up of, for example, adequate electronic devices, such as TTLs and transistors.

The graphics bus 6 is a means for transferring the data or the controlling signals through the graphics bus controller 5 between the CPU 1 and the main memory 3 and the rendering processor 7, the frame buffer 8, the Z buffer, the texture buffer 10, and the DAC 11. The graphics bus 6 can be made up of, for example, adequate electrical harnesses and connectors.

The rendering processor 7 is a means for writing pixels on spans and the like into the frame buffer 8. The rendering processor 7 can be made up of, for example, adequate electronic devices, such as TTLs, transistors, a CPU, a RAM, and a ROM.

The frame buffer 8 is a means for storing an image to be displayed on the monitor 12. The frame buffer 8 can be made up of, for example, adequate electronic devices, such as a RAM which is a semiconductor device.

The Z buffer is a means for eliminating a so-called hidden surface. The Z buffer can be made up of, for example, adequate electronic devices, such as a RAM which is a semiconductor device.

The texture buffer 10 is a means for storing texture data to be texture-mapped. The texture buffer 10 can be made up of, for example, adequate electronic devices, such as a RAM which is a semiconductor device.

The DAC 11 is a means for reading digital image data from the frame buffer 8 at predetermined intervals before converting to analog data. The DAC 11 can be made up of, for example, adequate electronic devices, such as TTLs and transistors.

The monitor 12 is a means for displaying results of pixel data. The monitor 12 can be made up of, for example, an adequate CRT, liquid crystal display, or EL display.

Figure 1:
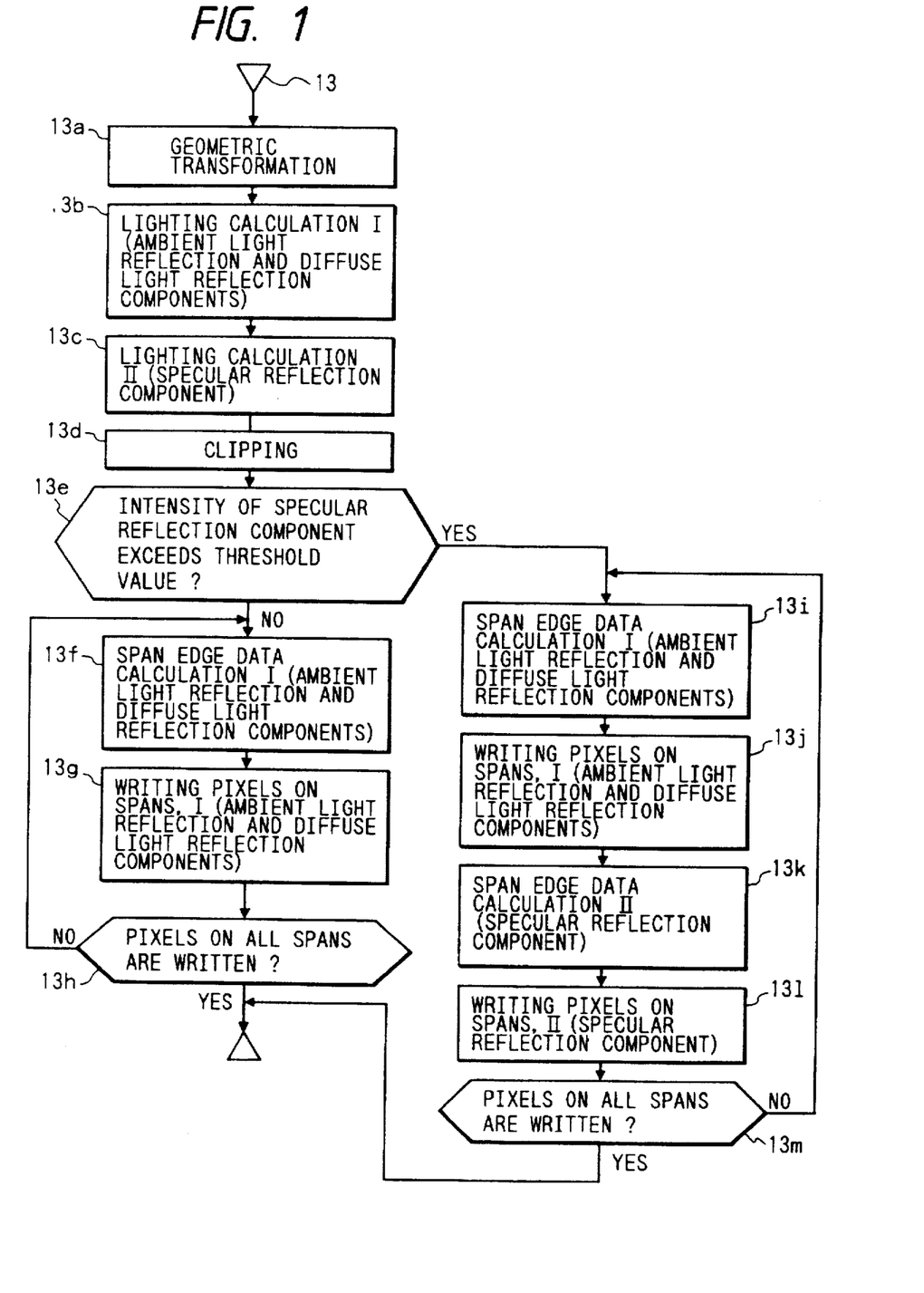
FIG. 1 is a flow chart illustrating an example of a texture mapping method according to the present invention.

In turn, the following describes displaying procedures for mapping a polygonal texture in detail by reference to FIG. 1.

FIG. 1 is a flow chart illustrating the procedures for mapping the polygonal texture.

Most of the mapping processes are executed by the CPU 1. Only the processes at steps 13g, 13j, and 13l, however, are made by the rendering processor 7. That is, the CPU 1 sends a command process parameter to the rendering processor 7 through the system bus 4 and the graphics bus 6 to make the rendering processor 7 execute the processes at steps 13g, 13j, and 13l.

First, step 13a executes coordinate transformation of vertices of a polygon forming an object to be displayed. Step 13a also makes coordinate transformation of a vertex normal vector.

Step 13b calculates lightings of an ambient light reflection component and a diffuse light reflection component in terms of light source data, the reflection coefficient, and the normal vector.

Step 13c calculates a lighting of a specular reflection component.

Step 13d clips portions projected out of a displayed range of the polygon.

Detailed description of the processes at steps 13a to 13d is ignored here as they have been widely and generally known in the process of displaying a three-dimensional object. (As an example, see Computer Graphics Principles and Practice, AddisonWesley Publishing Company, Inc., Chapter 18, Section 3, pp. 866873, 1990, entitled "Standard Graphics Pipeline," by James D. Foley et al.)

In turn, step 13e judges whether or not a light intensity of the specular reflection component at any of the vertices exceeds a predetermined threshold value. If so, the step is branched to step 13i in view of the specular reflection component.

If not, control goes to step 13f.

It should be noted that the threshold Value should be predetermined by a software.

Step 13f dissects the polygon mentioned above into spans. The step then obtains edge data of each span on which pixels are to be written. That is, the step derives the red, green and blue color intensities (hereinafter referred to as the RGB intensities) in terms of coordinates at both edges, texture coordinates, the ambient light reflection component, and the diffuse light reflection component. The RGB intensities at the span edges can be obtained in terms of the RGB intensities at the vertices by, for example, linear color interpolation.

Also, step 13f obtains RGB intensity increments, a Z coordinate increment, and texture coordinate increments for use in calculation by a DDA, which will be described later.

Step 13g blends the texture data having been stored in the texture buffer 10 into the RGB intensities of the ambient light reflection component and the diffuse light reflection component. The step then writes into the frame buffer 8 the RGB intensities obtained as results of the blending as to the pixels on the span.

Step 13h judges whether or not writing the pixels on all of the spans has ended. If not, control returns to step 13f before this step repeats the same series of processes.

On the other hand, if the specular reflection component should be taken into account, step 13i executes the same process as in step 13f. That is, the step dissects the polygon into spans before obtaining edge data of each span on which pixels are to be written.

Step 13j executes the same process as in step 13g.

Step 13k changes the span edge data obtained at step 13i. That is, the step adds the RGB intensity values representing the specular reflection component to the RGB intensity values having been written in the frame buffer 8.

Step 13l writes pixels on the span in terms of the edge data obtained at step 13k.

Before writing, the step 13k adds the values representing the specular reflection component to the values having been stored at predetermined addresses of the frame buffer 8.

Step 13m judges whether or not writing the pixels on all of the spans has ended. If not, control returns to step 13f before this step repeats the same series of processes.

As described above, the embodiment can separate the ambient light reflection component and the diffuse light reflection component from the specular reflection component to execute the texture mapping.

Such an execution should be made only if the values representing the specular reflection component exceed the predetermined threshold values. The execution also can be made without taking the specular reflection component into account.

Figure 3:
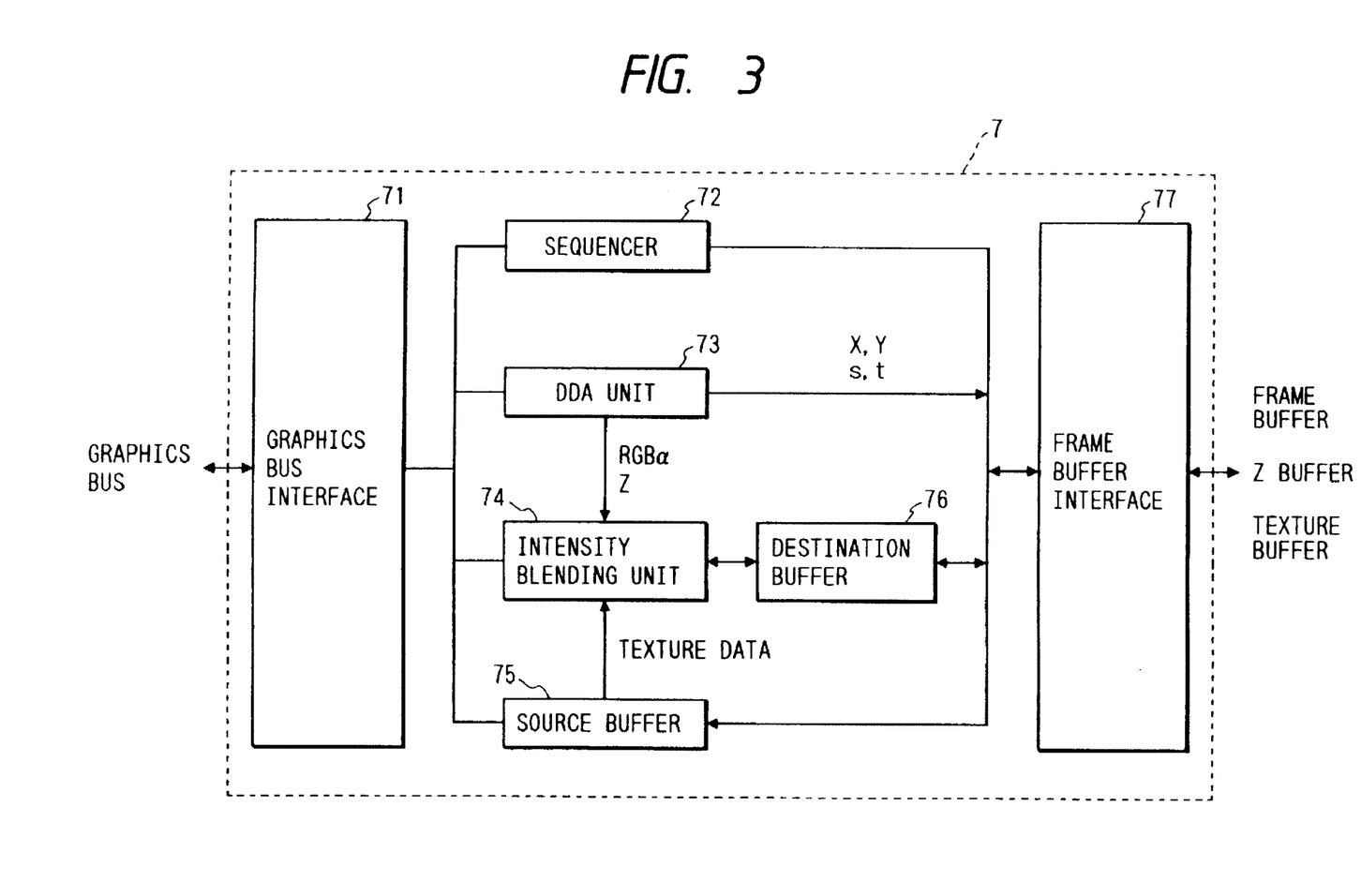
FIG. 3 is a block diagram illustrating an example of a rendering processor in the system shown in FIG. 2.

In turn, the following describes in detail how pixels are written on any of the spans by the rendering processor 7 which is an essential part of the present invention.

FIG. 3 is a block diagram illustrating an embodiment of the rendering processor 7.

The embodiment comprises a graphics bus interface 71, a sequencer 72, a DDA unit 73, an intensity blending unit 74, a source buffer 75, a destination buffer 76, and a frame buffer interface 77.

The graphics bus interface 71 is a means for connecting the graphics bus 6 to the rendering processor 7. The graphics bus interface 71 can be made up of, for example, adequate electronic devices, such as TTLs, transistors, and resistors.

The sequencer 72 is a means for controlling operations of the rendering processor 7, such as a number of pixels generated by the DDA unit 73. The sequencer 72 can be made up of, for example, adequate electronic devices, such as TTLs, transistors, and resistors.

The DDA unit 73 is a means for calculating the coordinates X, Y, and Z of the pixels on each span, the RGB intensities R, G, and B, a transparency α, and the texture coordinates (s, t). The DDA unit 73 can be made up of, for example, adequate electronic devices, such as a register, a semiconductor memory, a CPU, a ROM, and an adder.

In general, the DDA is the means heretofore known for use in calculation of the pixel values. The DDA has been disclosed in many materials, such as that by W. M. Newman, "Interactive Computer Graphics," McGRAW-HILL BOOK Co.

The DDA is the means for making a predetermined calculation on the basis of a given differential equation to generate a pattern. One of the known constructions of the DDA is of the Bresenham type having the integer type calculation used for floating-point calculation and rounding in calculation.

The intensity blending unit 74 is a means for blending the RGB intensities fed out of the DDA unit 73 with the texture data having been fetched in the source buffer 75 corresponding to the above-mentioned texture coordinates. The intensity blending unit 74 can be made up of, for example, adequate electronic devices, such as TTLs and transistors.

The source buffer 75 is a means for reading the data at the corresponding addresses of the texture buffer 10 through the frame buffer interface 77 on the basis of the texture addresses s and t fed out of the DDA unit 73 to fetch therein.

The source buffer 75 can be made up of, for example, adequate electronic devices, such as TTLs and a RAM.

The destination buffer 76 is a means for storing results of the process of the intensity blending unit 74. The destination buffer 76 can be made up of, for example, adequate electronic devices, such as a RAM.

The data stored in the destination buffer 76 are written into corresponding addresses of the frame buffer 8 through the frame buffer interface 77.

The destination buffer 76 also holds the values corresponding to any of the pixels before being written in the frame buffer 8 and the values of the Z buffer for eliminating the hidden surface. The destination buffer 76 further holds results of the calculation made by the intensity blending unit 74.

The frame buffer interface 77 is a means for making the destination buffer 76 or the source buffer 75 fetch the data stored at the corresponding addresses therein from the frame buffer 8, the Z buffer, and the texture buffer 10 on the basis of the pixel coordinates X and Y and the texture coordinates s and t fed out of the DDA unit 73. The frame buffer interface 77 also writes the RGB intensities or the Z coordinate of the destination buffer 76 into the frame buffer 8 or the Z buffer. The frame buffer interface 77 can be made up of, for example, adequate electronic devices, such as TTLs, transistors, and resistors.

Figure 7:
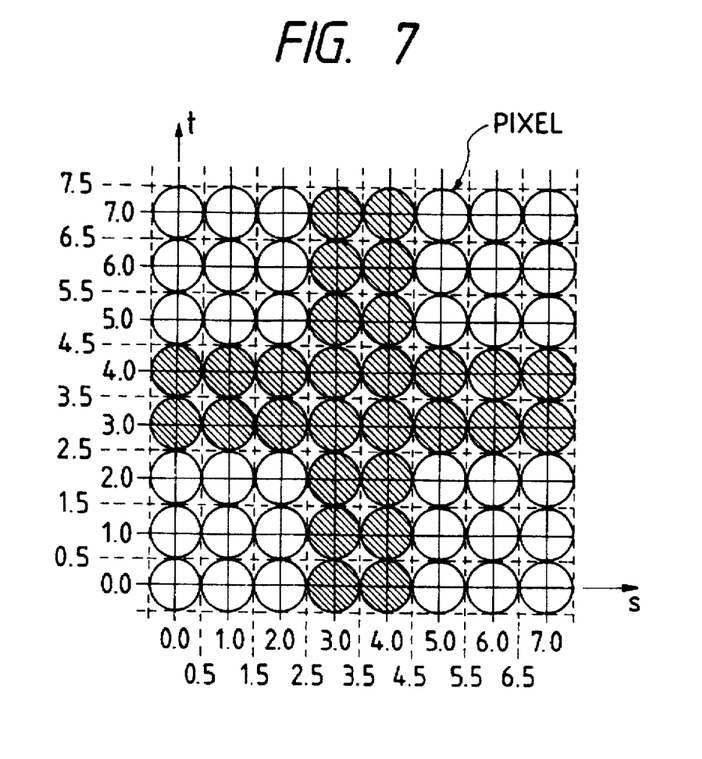
FIG. 7 shows an example of texture data.

FIG. 7 is an example of the texture data.

The whole texture data shown is of a cross pattern written in a display area composed of 8×8 pixels. The texture coordinates s and t are defined in a range from (0, 0) to (7, 7). Circles in the figure represent the pixels of the texture. The center of each pixel has integer coordinate values.

As described above, the DDA unit 73 calculates the texture coordinates s and t of each image. In general, however, the texture coordinates s and t are not always integers, or not always at the center of the texture data pixel, or mostly not integers. In such a case, for example, it is made to fetch values of the texture data at a pixel of integer coordinates nearest thereto.

Figure 4:
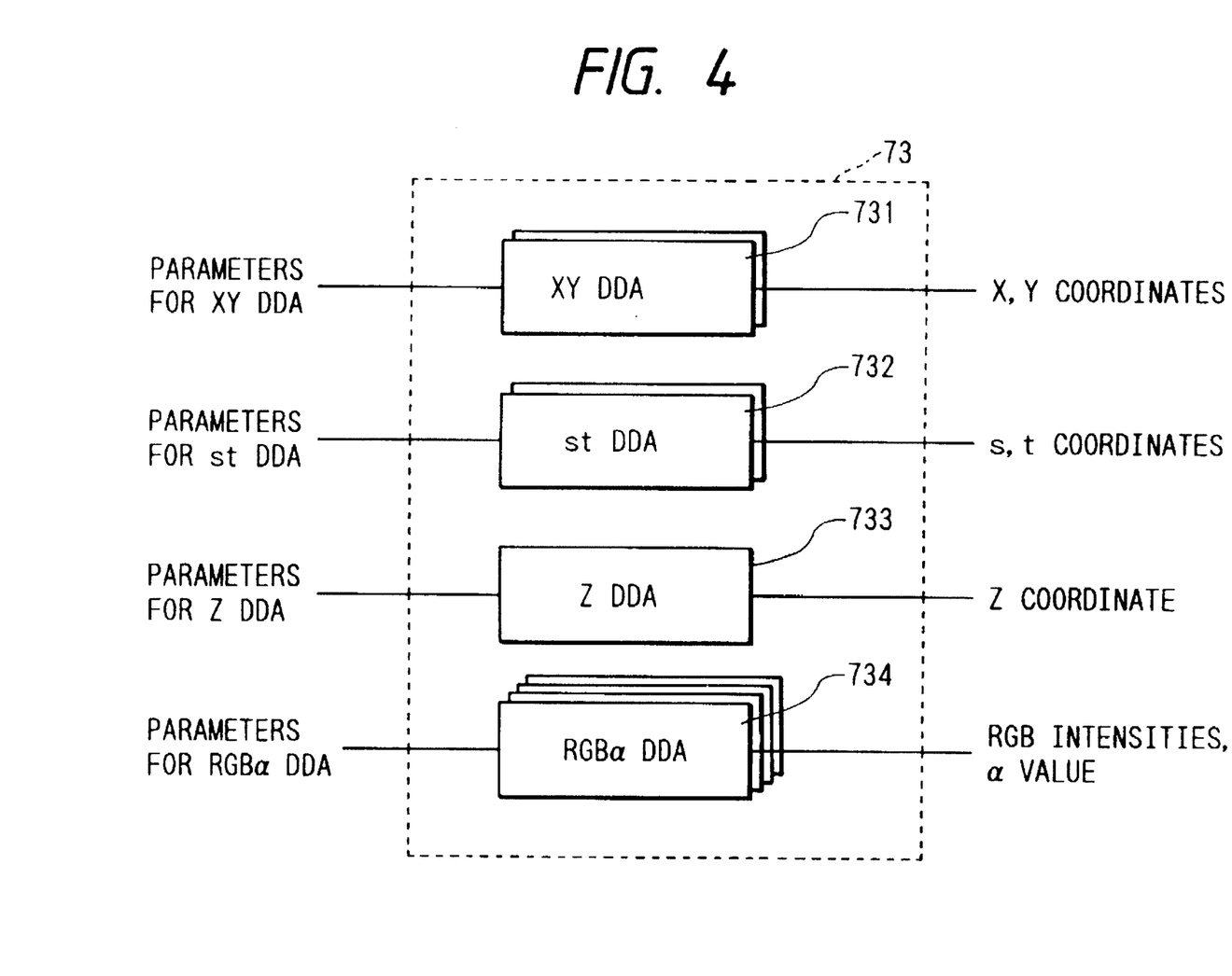
FIG. 4 is a block diagram illustrating an example of construction of a DDA unit in the rendering processor shown in FIG. 3.

In turn, the following describes a construction of the DDA unit 73 provided in the rendering processor 7 by reference to FIG. 4.

FIG. 4 is an example of the construction of the DDA unit 73.

The DDA unit 73 in the embodiment comprises a DDA 731 for the coordinates X and Y, a DDA 732 for the coordinates s and t, a DDA 733 for the Z coordinate, and a DDA 734 for the RGB transparency α.

The DDA 731 for the coordinates X and Y is a means for calculating the coordinates for the pixel to be written.

The DDA 732 for the coordinates s and t is a means for generating the texture coordinates of the texture to be mapped.

The DDA 733 for the Z coordinate is a means for generating the Z coordinate of the pixel to be hidden.

The DDA 734 for the RGB transparency α is a means for calculating the RGB intensities and the α value representing the transparency.

Thus, these means can generate the coordinate data and the RGB intensities of the pixels needed to write the pixels on the spans.

Figure 5:
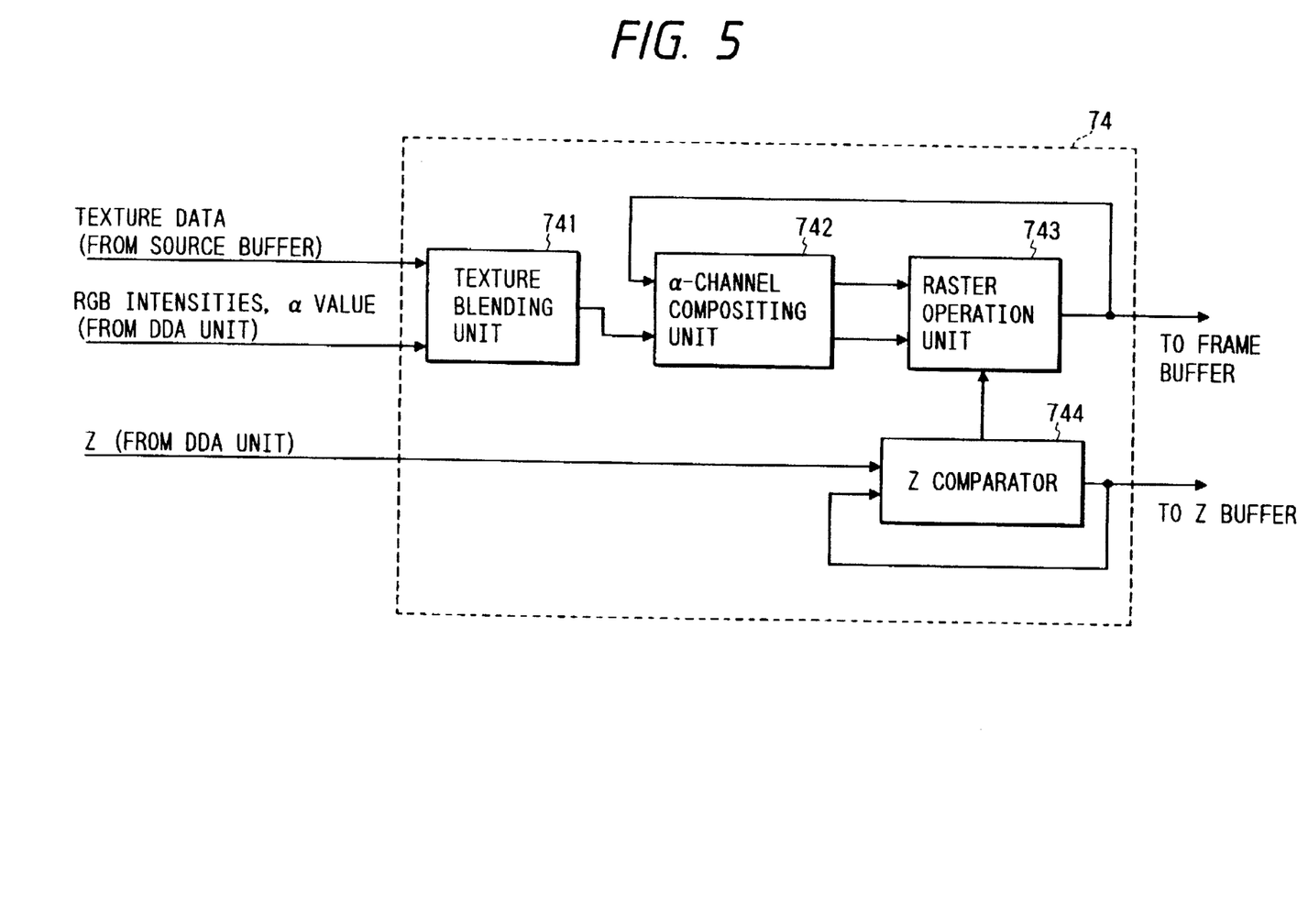
FIG. 5 is a block diagram illustrating an example of an intensity blending unit in the rendering processor shown in FIG. 3.

In turn, the following describes an example of construction of the intensity blending unit 74 provided in the rendering processor 7 by reference to FIG. 5.

In the example, the intensity blending unit 74 comprises a texture blending unit 741, an α-channel composing unit 742, a raster operation unit 743, and a Z comparator 744.

The texture blending unit 741 is a means for blending the texture data fed from the source buffer 75 with the RGB data from the DDA unit 73 in a predetermined method before sending the blended data to the α-channel composing unit 742. The texture blending unit 741 can be made up of, for example, adequate electronic devices, such as TTLs, transistors, and resistors.

The α-channel composing unit 742 is a means for making the so-called α-channel compositing. The α-channel composing unit 742 can be made up of, for example, adequate electronic devices, such as TTLs, transistors, and resistors. (The α-channel composing unit 742 is disclosed, for example, in Computer Graphics Principles and Practice, Addison-Wesley Publishing Company, Inc., Chapter 17, Section 6, Subsection 1, pp. 835–840, 1990, entitled "α-Channel Compositing," by James D. Foley et al.) The α-channel compositing is a process for blending the RGB intensity values of the pixel to be written with the RGB intensity values stored in the frame buffer 8 corresponding to the pixel in a specified ratio.

The raster operation unit 743 performs the following processes.

a. To move or copy image data in a rectangular area stored in the frame buffer 8 to other locations in the frame buffer 8.

b. To halt writing into the frame buffer 8 the data of the pixel by a signal indicating that the pixel is not needed to be displayed as hidden by other objects, like the hidden surface elimination. The signal is generated by the Z comparator 744.

c. To execute a calculation, such as addition, OR operation, AND operation, or exclusive-OR operation, of the RGB intensity values of the pixel read out of the frame buffer 8, or the RGB intensity values already stored in the frame buffer 8, with the RGB intensity values of the corresponding pixel generated by the texture blending unit 741 and the α-channel composing unit 742. Also, to write the RGB intensity values obtained as results of the calculation into the addresses of the pixel in the frame buffer 8. Further, if such an execution of calculation is not needed, to write the RGB intensity values of the pixel generated by the texture blending unit 741 and the α-channel composing unit 742 into the addresses of the pixel in the frame buffer 8 without performing the calculation.

Step 13g or 13j shown in the flow chart in FIG. 1 directs the raster operation unit 743 to write the data output of the α-channel composing unit 742 into the addresses of the pixel in the frame buffer 8 directly. Step 131, however, directs the raster operation unit 743 to add the data output of α-channel composing unit 742 to the RGB intensity values read out of the frame buffer 8 before writing results of the addition into the addresses of the pixel in the frame buffer 8. This results in that the RGB intensity values representing the specular reflection component are added to the RGB intensity values having been obtained by blending the texture data with the sum of the ambient light reflection component and the diffuse light reflection component. It should be noted that no special buffer is needed for temporal storage of the RGB intensity values obtained by blending the texture data with the sum of the ambient light reflection component and the diffuse light reflection component. This is because the frame buffer 8 is used for the temporal storage.

The above description of the raster operation unit 743 in FIG. 5 ignored the existence of the destination buffer 76 shown in FIG. 3 for simplicity of explanation. In fact, the data output of the raster operation unit 743 and the Z comparator 744 in FIG. 5 are written in the frame buffer 8 and Z buffer a through the destination buffer 76 and the frame buffer interface 77. It also is made through the frame buffer interface 77 and the destination buffer 76 to read the existing data from the frame buffer 8 or the Z buffer before feeding them to the α-channel composing unit 742 or the Z comparator 744.

The Z comparator 744 is a means for comparing the Z coordinate value from the DDA unit 73 with the Z coordinate value stored in the Z buffer. If the data of the pixel existing nearer to a viewpoint has been already written in the frame buffer 8, the Z comparator 744 directs the raster operation unit 743 not to write any pixel. The Z comparator 744 can be made up of, for example, adequate electronic devices, such as TTLs, resistors, and transistors.

With these means provided as such, the texture-mapped pixel is written on a span. In addition, the α-channel compositing and the hidden surface elimination which have been conventionally used as the display processing techniques are accomplished.

Figure 6:
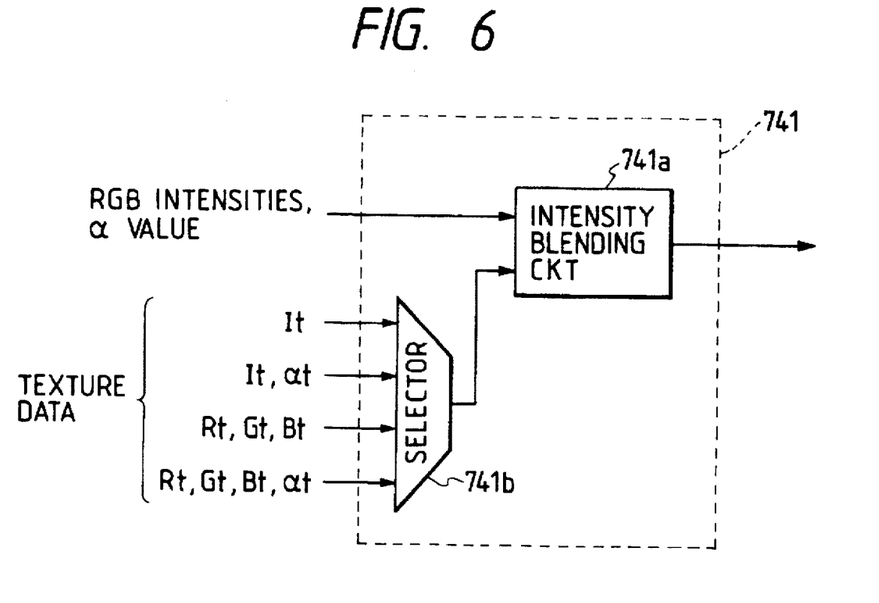
FIG. 6 is a block diagram illustrating an example of construction of a texture blending unit in the intensity blending unit shown in FIG. 5.

FIG. 6 is an example of construction of the texture blending unit 741.

The texture blending unit 741 in the example has an intensity blending circuit 741a and a selector 741b.

The intensity blending circuit 741a is a means for executing the texture blending itself. The intensity blending circuit 741a can be made up of, for example, adequate electronic devices, such as TTLs, resistors, and transistors.

The selector 741b is a means for selecting data depending on the kind of texture data used. The selector 741b can be made up of, for example, adequate electronic devices, such as TTLs, resistors, and transistors.

The texture blending unit 741 in the example can select any of four texture data, such as (1) a brightness or gray scale information It alone, (2) the brightness or gray scale information It and the transparency αt, (3) the texture RGB intensities Rt, Gt, and Bt, and (4) the texture RGB intensities Rt, Gt, and Bt and the transparency αt.

Figure 8:
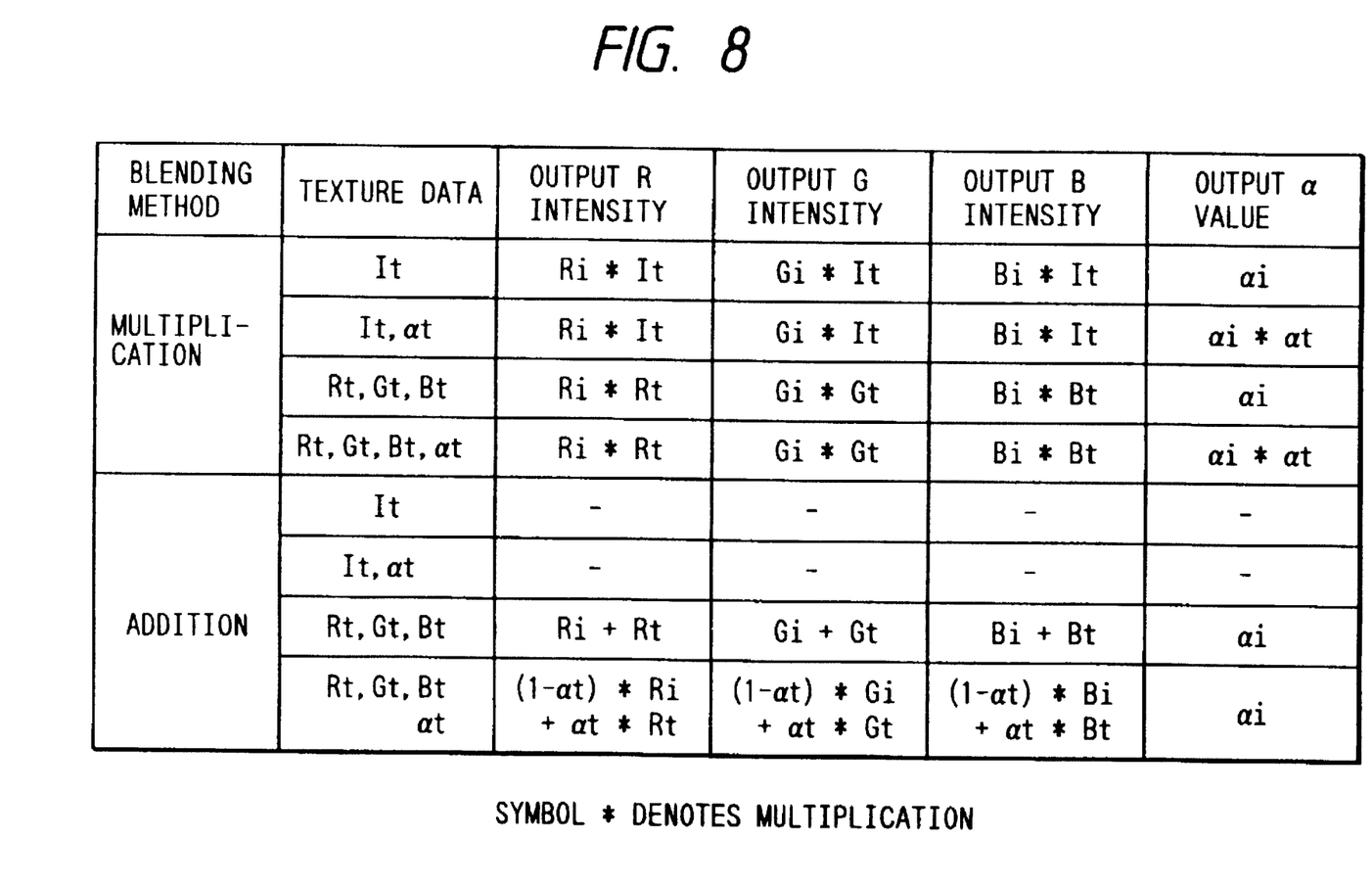
FIG. 8 illustrates examples of processes for blending texture data with RGB intensities of light reflection components.

The intensity blending circuit 741a performs any of the blending processes, additions and multiplications, shown in FIG. 8. In the figure, Ri, Gi, Bi and αi denote the RGB intensities and the α value input to the intensity blending unit 74.

Blending methods include, for example, multiplication and addition. FIG. 8 shows examples of the RGB intensities and the output α value depending on the kind of texture data.

If no texture mapping is needed, of course, the RGB intensity blending should not be made so that the data R, G, B, and α input from the DDA unit 73 can be directly fed out.

As described so far, the rendering processor 7 can make the texture mapping to write a pixel on a span.

Of course, the present invention has the advantage that the rendering processor 7 can write a pixel on a span without texture mapping.

Also, with the processes described with reference to FIG. 1, the present invention has the advantage that the properties of the reflection components can be taken into account to make the texture mapping for realistic writing of the pixel on the span without any highlight disturbance.

Further, the present invention has the advantage that its characteristics, such as the processing speed, can be maintained as usual since only the single set of DDAs is needed for the RGB intensity calculations. This is because the RGB intensities due to the specular reflection component are taken into account only if necessary. Of course, there may be provided two independent sets of DDAs for the RGB intensity calculations, one for the ambient light reflection component and the diffuse light reflection component and the other for the specular reflection component, for blending the RGB intensities in parallel.

In short, the present invention provides realistic texture mapping depending on the property of the light reflection component, particularly in natural highlight representation.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A display method in which intensities of light reflected from a plurality of portions on a surface of an object to be displayed are calculated, texture data of said object to be displayed are blended with values of the calculated intensities of the reflected light, and an image of said object is displayed on the basis of the blended values of the texture data with the calculated intensities of the reflected light, said method comprising the steps of:

calculating an ambient light reflection component value on each of a plurality of vertexes of a primitive forming said object to be displayed, a diffuse light reflection component value on each vertex, and a specular reflection component value of intensity of the reflected light on each vertex, based upon direction vectors toward a light source and a viewpoint, a light source intensity, an ambient light intensity, and an ambient reflection coefficient, a diffuse reflection coefficient, a specular reflection coefficient, and a specular-reflection exponent of said each of said vertexes of said primitive;

summing up the calculated ambient light reflection component value and the calculated diffuse light reflection component value on each vertex of said primitive;

interpolating between at least two of the summed up component values of said vertexes to calculate an interpolated intensity value of each pixel laying between said vertexes;

modifying said interpolated intensity value of each of said pixels by the value of said texture data on a corresponding pixel;

judging whether or not the calculated value of said specular reflection component exceeds a predetermined value;

interpolating between at least two of the calculated values of the specular reflection components on the vertexes of said primitive, to calculate an interpolated specular reflection value of each pixel lying between said vertexes, when said calculated specular reflection component value of at least one of said vertexes of said primitive exceeds said predetermined value, in said judging step; and adding the calculated interpolated specular reflection value to the modified interpolated intensity value of said each pixel.

2. A display method according to claim 1, wherein said interpolating step for the intensity values and the interpolating step for the specular reflection values are executed by a device for interpolation, at different times.

3. A display apparatus which displays an image of an object to be displayed on the basis of calculated values of intensities of light reflected from a plurality of portions on a surface of said object to be displayed and texture data of said object to be displayed, said apparatus comprising:

means for calculating an ambient light reflection component value of each of at least two vertexes of a primitive forming said object to be displayed, a diffuse light reflection component value of said each vertex, and a specular reflection component value of intensity of reflected light of said each vertex, based upon direction vectors toward a light source and a viewpoint, a light source intensity, an ambient light intensity, and an ambient reflection coefficient, a diffuse reflection coefficient, a specular reflection coefficient, and specular reflection exponent of said each vertex of said primitive;

means for summing up the calculated ambient light reflection component value and the calculated diffuse light reflection component value on each vertex of said primitive;

means for interpolating between at least two of the summed up component values of said vertexes to calculate an interpolated intensity value of each pixel lying between said at least two vertexes;

means for modifying said interpolated intensity value of said each pixel by the value of said texture data on a corresponding pixel;

means for judging whether or not the calculated value of said specular reflection component exceeds a predetermined value;

means for interpolating between at least two of the calculated values of the specular reflection components on the vertexes of said primitive, to calculate an interpolated specular reflection value of each pixel lying between said at least two vertexes, when said calculated specular reflection component value of at least one of said vertexes of said primitive exceeds said predetermined value, by said judging means; and means for adding the calculated interpolated specular reflection value to the modified interpolated intensity value of said each pixel.

4. A display apparatus according to claim 3, wherein said interpolating means for the intensity values and said interpolating means for the specular reflection component values are the same apparatus used separately in time series.

5. A display apparatus which displays an image of an object to be displayed on the basis of calculated values of intensities of light reflected from a plurality of portions on a surface of said object to be displayed and texture data of said object to be displayed, said apparatus comprising:

means for calculating an ambient light reflection component value of each of at least two vertexes of a primitive forming said object to be displayed, a diffuse light reflection component value of said each vertex, and a specular reflection component value of intensity of reflected light of said each vertex, based upon direction vectors toward a light source and a viewpoint, a light source intensity, an ambient light intensity, and an ambient reflection coefficient, a diffuse reflection coefficient, a specular reflection coefficient, and a specular reflection exponent of said each vertex of said primitive;

means for summing up the calculated ambient light reflection component value and the calculated diffuse light reflection component value on each vertex of said primitive;

means for interpolating between at least two of the summed up component values of said vertexes to calculate an interpolated intensity value of each pixel lying between said at least two of said vertexes;

means for modifying said interpolated intensity value of said each pixel by the RGB intensity values of said texture data on a corresponding pixel;

means for judging whether or not the calculated value of said specular reflection component exceeds a predetermined value;

means for interpolating through said device, between at least two of the calculated values of the specular reflection components on the vertexes of said primitive, to calculate interpolated specular reflection value of each pixel lying between said at least two vertexes, when said calculated specular reflection component value of at least one of said vertexes of said primitive exceeds said predetermined value, by said judging means; and means for adding the calculated interpolated specular reflection value to the modified interpolated intensity value of said each pixel.

* * * * *